April 13, 1965   C. W. GASKA   3,177,959
GROUND EFFECT VEHICLE OF THE PLENUM CHAMBER TYPE
WITH PROPELLING AND STEERING MEANS
Filed June 1, 1959   2 Sheets-Sheet 1
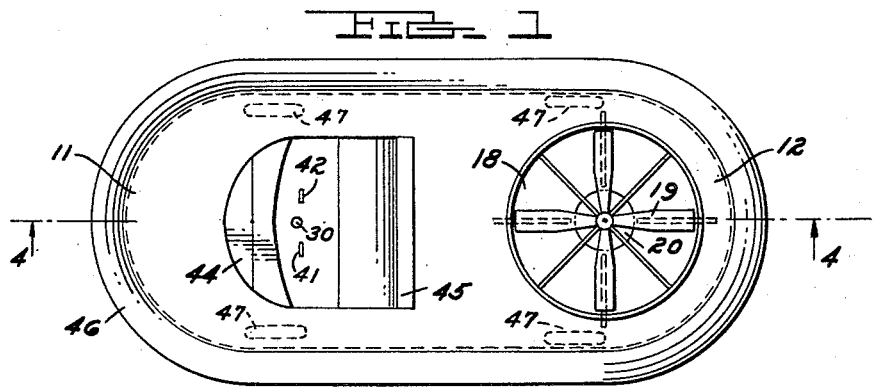
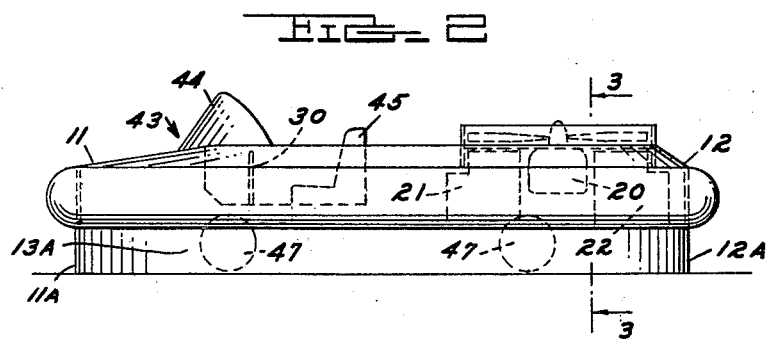
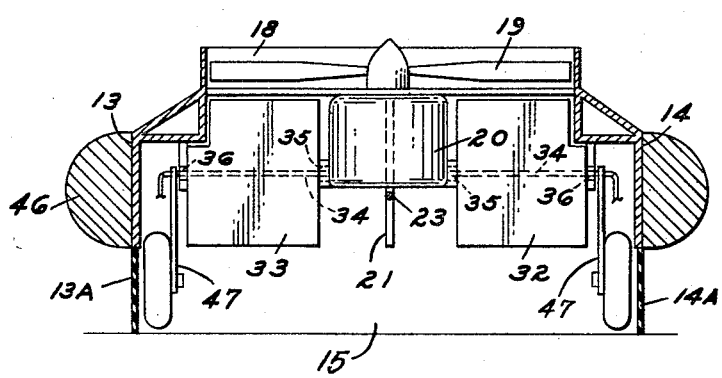
INVENTOR.
CASS W. GASKA
BY
ATTORNEY

INVENTOR.
CASS W. GASKA

United States Patent Office 3,177,959
Patented Apr. 13, 1965

3,177,959
GROUND EFFECT VEHICLE OF THE PLENUM CHAMBER TYPE WITH PROPELLING AND STEERING MEANS
Cass W. Gaska, Royal Oak, Mich., assignor to Carwil Enterprises, Incorporated, Daytona Beach, Fla., a corporation of Florida
Filed June 1, 1959, Ser. No. 817,168
4 Claims. (Cl. 180—7)

This invention relates to air-borne vehicles and more particularly pertains to a vehicle for traveling closely adjacent a supporting surface such as land and/or water on an air cushion under a housing and controlled and propelled by fluid air streams within the housing and supporting air cushion.

Air-borne vehicles have been employed heretofore, however, the several devices of the prior art have not proven entirely satisfactory inasmuch as they are complicated in design and construction, expensive to manufacture, difficult to use, and do not maintain sufficient surface contact and influence for adequate propulsion and control.

With the foregoing in view, the primary objects of the invention is to provide an air-borne vehicle which is simple in design and construction, inexpensive to manufacture, easy to use, easy to operate, and which maintains adequate surface contact and influence to facilitate propulsion and control.

An object of the invention is to provide a housing having a top wall and depending side/and end walls defining an open bottom air confining chamber relative to the supporting surface with the air cushion plenum being defined by the housing relative to the supporting surface.

An object of the invention is to provide an open bottom housing adapted to operate closely adjacent the supporting surface so as to be substantially close thereto to create a plenum chamber directly bearing against the supporting surface so as to project the plenum air pressure directly against the supporting surface.

An object of the invention is to provide an air entrance aperture in the housing top wall for feeding air to the housing air cushion chamber.

An object of the invention is to provide an air propelling fan disposed in the top wall aperture directing a fluid stream of air downwardly into the chamber-plenum to fill same with a pressurized air cushion bearing directly against the supporting surface in vehicle supporting relationship with the fan being capable of over-supplying the air cushion so as to raise the side wall bottom edges slightly above the supporting surface to make the vehicle air-borne.

An object of the invention is to provide angularly variable vanes in the housing below the fan in the air stream developed by the fan for angulating of the fluid air stream leading therefrom for varying the fluid streams within the chamber relative to the supporting surface to control propulsion and steering.

An object of the invention is to provide a flexible skirt portion in the vehicle side and end walls for by-passing supporting surface projections such as rocks and waves.

An object of the invention is to provide an air-borne vehicle which travels with equal facility on both land and water.

An object of the invention is to provide a surrounding bumper-pontoon capable of supporting the vehicle on water while at rest.

An object of the invention is to provide wheels for optionally supporting the vehicle on land while at rest.

An object of the invention to provide control means for the air stream influencing vanes which render the vanes selectively operable singly or in combination with each other for providing complete control of the direction and movement of the vehicle.

These and other objects of the invention will become apparent by reference to the following description of an air-borne vehicle embodying the invention taken in connection with the accompanying drawings in which:

FIG. 1 is a top plan view of the inventive device.

FIG. 2 is a side elevational view of the device seen in FIG. 1.

FIG. 3 is a cross-sectional view, slightly enlarged, of the device seen in FIG. 2 taken on the line 3—3 thereof.

Figure 4:
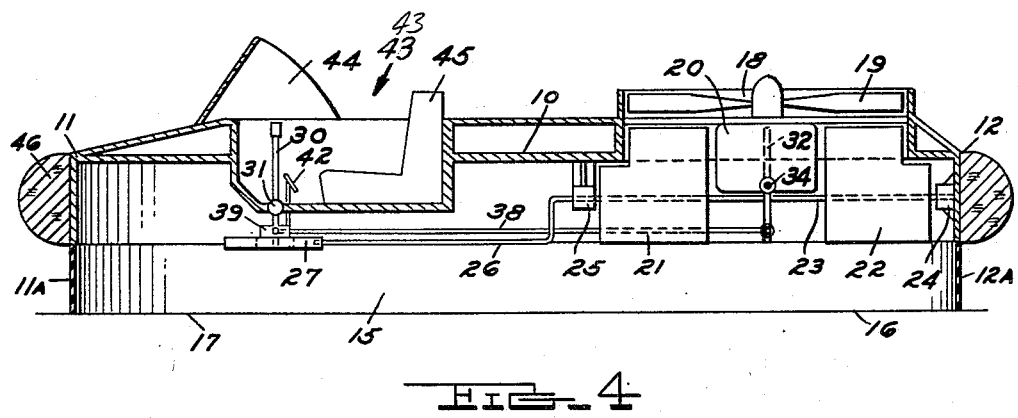
FIG. 4 is an enlarged cross-sectional view of the device seen in FIG. 1 taken on the line 4—4 thereof.
Figure 5:
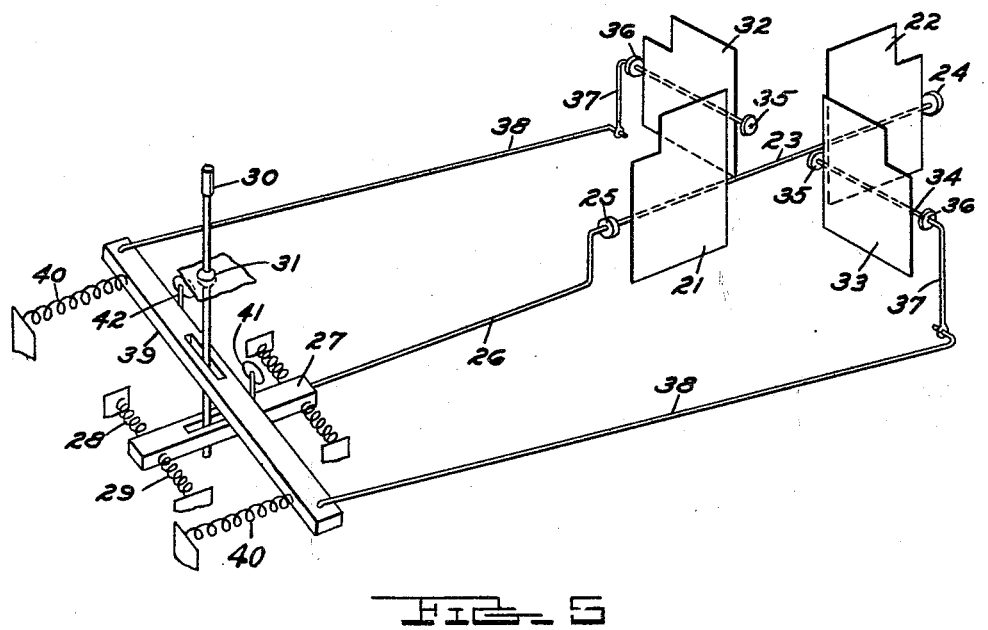
FIG. 5 is a perspective diagrammatic view of the control vane-deflectors and control means.

Referring now to the drawing wherein like numerals refer to like and corresponding parts throughout the several views, the air-borne, air-propelled, and air controlled vehicle disclosed therein to illustrate the invention comprises a top wall 10 inter-connected with end walls 11 and 12 and side walls 13 and 14 which together define the chamber-plenum 15 interiorly thereof which is open at the bottom 16 so as to be in direct opposition to the supporting surface 17. It is to be noted that the walls in their bottom portions are preferably formed by the flexible skirts 11a–14a and it has been found that the flexible bottom portions 11a–14a are extremely advantageous in by-passing supporting surface 17 projections such as rocks and waves.

The top wall 10 has an air inlet aperture 18 preferably disposed adjacent the rear of the vehicle shrouding the air propelling fan 19 which is driven by the motor 20 so as to direct and force air downwardly into the interior of the chamber-plenum 15 in a fluid stream in direct opposition to the supporting surface 17 so as to impinge the fluid stream of air against the support surface for propelling and controlling purposes as well as to fill the chamber-plenum 15 with an air cushion to support the vehicle and it is to be noted that the fore part of the vehicle does not have any apertures in the top wall 10 so that the cushion of air thereunder fully bears thereagainst elevating the fore part of the vehicle slightly relative to the rear portion of the vehicle due to the fact that there is more supporting air cushion surface in the fore part of the vehicle.

The control vanes include pivotally supported lateral deflectors 21 and 22 disposed along the longitudinal axis of the vehicle for angularly varying the direction of the fluid air stream sidewise to provide sidewise direct control forces relative to the supporting surface for sidewise stabilization and propelling force for sidewise movement. These deflectors are pivotally mounted on the rod 23 intermediate their top and bottom ends so as to deflect the air from a point adjacent the fan 19 to a point adjacent the supporting surface 17 with the control rod 23 being mounted in bearings 24 and 25 and controlled by a crank 26 or other medium, the angular variation of which is controlled by sidewise movement of the block 27 with block 27 neutrally disposed between the opposed springs 28 and 29 with the block position being variable to vary the crank 26 angulation by the control rod or stick 30 which is pivotally mounted at 31. Sidewise movement of the stick 30 moves the block 27 sidewise so as to move the crank 26 angularly to swing the vanes on the pivot rod 23 to direct the air stream from the fan sidewise.

The vanes also include the pivotally mounted and supported deflectors 32 and 33 which are disposed along the lateral axis of the vehicle for angularly varying the direction of the fluid air stream endwise to provide endwise directed control forces relative to the supporting surface for endwise stabilization and propelling movement. Each vane or deflector 32 and 33 is separately pivotally mounted on a pivot rod 34 intermediate their top and bottom which is bearinged at 35 and 36 and each is provided with a crank arm 37 operated by the link 38 leading to the ends of the bar 39 with the bar pivotally neutrally being biased by the spring 40 and movable forwardly and rearwardly by the stick 30 and selectively pivotally variable by the pedals 41 and 42. If the stick 30 alone is moved forward or rearward the deflectors 33 and 32 move in combination and equal amounts whereas if foot influence is placed on the pedals 41 and/or 42 the pivotal position of the bar 39 is changed so that the amount of movement of the deflectors 33 and 34 can be controlled relative to one another so as to provide a variable and controllable angulation.

The stick 30 and associated controls are located in the cockpit 43 in the fore part of the vehicle behind the windshield 44 and ahead of the seat 45 so that the operator when positioned on the seat 45 can easily locate the stick 30 between his feet with his feet bearing on the pedals 41 and 42.

In operation the throttle controlled motor 20 is started driving the air propelling fan 19 moving a fluid stream of air downwardly through the housing aperture 18 past the vanes 21, 22, 33, and 32 into the interior of the chamber-plenum 15 in direct opposition to the supporting surface 17 whereupon the interior 15 of the housing is supplied with an air cushion under pressure so as to move the vehicle upwardly above the supporting surface 17 so that a slight gap occurs between the bottom of the housing walls 11–14 and in the event that the flexible skirt portions 11a–14a are used the device raises upwardly from the collapsed rest condition of the flexible walls to the point seen in the figures whereupon a slight gap occurs between the wall edges and the supporting surface thereby completely air supporting the vehicle on the confined cushion of air in the chamber-plenum 15 in direct opposition to the supporting surface 17. Upon the operator moving the stick 30 forwardly the bar 39 moves rearwardly moving the cranks 37 rearwardly and the deflectors 33 and 34 to a rearward inclination thereby directing a fluid stream of air rearwardly with impinging force directed against the supporting surface 17 so as to drive the vehicle forwardly and upon the vehicle varying in sidewise movement the operator moves the stick 30 sidewise as desired to move the vane-deflectors 21 and 22 sidewise to direct a fluid stream of air in a correcting or directing effect against the supporting surface to control and/or move the vehicle sidewise as desired. In the event of crabbing proceeding forward motion, such as angularly relative to a high wind, the operator moves the pedals 41 and 42 as desired to change the angle of inclination between the vane-deflectors 33 and 32 to co-ordinate the force directed by the vanes to the direction of movement desired relative to the resisting forces.

In the movement the flexible side wall or skirt portion has been found highly advantageous and it is extremely preferable due to the fact that it is fully capable of by-passing supporting surface obstructions such as rocks and waves without displacing motion of the vehicle thereby providing a stabilizing effect to the vehicle travel. The preferred embodiment of the vehicle disclosed includes the surrounding bumper pontoon 46 which supports the vehicle while at rest in the water and also includes the selectable retractable wheels 47 for optionally supporting the vehicle while at rest on land although it is perfectly obvious that the vehicle can support itself and/or be supported on the side wall portions or on the pontoons 46 themselves while on land and in the event that the wheels are not employed on land the flexible skirt portions or side wall portions 11a–14a merely collapse beneath the vehicle while at rest and upon activation of the motor the vehicle moves upwardly permitting flexible portions to expand to the position shown.

The inventive air-borne vehicle with these features constitutes a compact, durable, neat appearing mechanism, easily operated and inexpensively constructed for air-borne non-friction travel relative to a supporting surface whether it is land or water with equal facility.

Although but a single embodiment of the invention has been shown and described in detail, it is obvious that many changes may be made in the size, shape, detail, and arrangement of the various elements of the invention within the scope of the appended claims.

I claim:

1. A vehicle adapted to be raised from a surface by gas pressure and travel and be steered at low altitude represented by a perimetrical gas escape gap relative to said surface, said vehicle including a body having plenum space within an upwardly extending downwardly open hollow underside and said body having an inlet to said plenum space and having a lower perimeter, and means for vertically lifting, horizontally propelling and steering the vehicle, said means including pressurizing means on the vehicle communicating with said plenum space through said inlet for maintaining gas under pressure under said body to support the vehicle in a hovering position in the region of ground effect only with said lower perimeter of said body forming a perimetrical gas escape gap with said surface, and said first-mentioned means including horizontal propulsion and steering means on the vehicle for the vehicle to horizontally propel itself and be steered, said horizontal propulsion and steering means including generally horizontally axially pivotal vane means downstream of said pressurizing means and spaced upstream in said plenum space from said lower perimeter, said vane means having communication downstream of said vane means through said plenum space with said lower perimeter, for gas entering through said inlet to impinge upon said vane means and be deflected into said plenum space prior to escape under said lower perimeter to the atmosphere, and means for turning said vane means pivotally through various angles relative to said surface for the vehicle to horizontally propel itself by thrust of gas resulting from the deflection of gas by said vane means while the vehicle is lifted by ground effect on gas in said plenum space, and said horizontal propulsion and steering means including means for the vehicle to be steered.

2. A vehicle adapted to be raised from a surface by gas pressure and travel and be steered at low altitude represented by a perimetrical gas escape gap relative to said surface, said vehicle including a body having plenum space within an upwardly extending downwardly open hollow underside and said body having an inlet to said plenum space and having a lower perimeter, and means for vertically lifting, horizontally propelling and steering the vehicle, said means including pressurizing means on the vehicle communicating with said plenum space through said inlet for maintaining gas under pressure under said body to support the vehicle in a hovering position in the region of ground effect only with said lower perimeter of said body forming a perimetrical gas escape gap with said surface, and said first-mentioned means including horizontal propulsion and steering means on the vehicle for the vehicle to horizontally propel itself and be steered, said horizontal propulsion and steering means including a pair of separately angularly variable vanes, each said vane being adapted to turn selectively in phase and out of phase relative to the other said vane on a generally horizontal axis extending transversely of said body each said vane being downstream of said pressurizing means and spaced upstream in said plenum space from said lower perimeter, and each said vane having communication downstream of said vane through said plenum space with said lower perimeter, for gas entering through said inlet to impinge upon said vanes and be deflected into said plenum space prior to escape under said lower perimeter to atmosphere, and means for turning said vanes pivotally selectively in phase and out of phase with respect to each other for said vanes to take various angles relative to said surface for the vehicle to horizontally propel itself and be steered by thrust of gas resulting from deflection of gas by said vanes while the vehicle is lifted by ground effect on gas in said plenum space.

3. A vehicle adapted to be raised from a surface by gas pressure and travel and be steered at low altitude represented by a perimetrical gas escape gap relative to said surface, said vehicle including a body having plenum space within an upwardly extending downwardly open hollow underside and said body having an inlet to said plenum space and having a lower perimeter, and means for vertically lifting, horizontally propelling and steering the vehicle, said means including pressurizing means on the vehicle communicating with said plenum space through said inlet for maintaining gas under pressure under said body to support the vehicle in a hovering position in the region of ground effect only with said lower perimeter of said body forming a perimetrical gas escape gap with said surface, and said first-mentioned means including horizontal propulsion and steering means on the vehicle for the vehicle to horizontally propel itself and be steered, said horizontal propulsion and steering means including generally horizontally axially pivotal vane means downstream of said pressurizing means and spaced upstream in said plenum space from said lower perimeter, said vane means having communication downstream of said vane means through said plenum space with said lower perimeter, for gas entering through said inlet to impinge upon said vane means and be deflected into said plenum space prior to escape under said lower perimeter to the atmosphere, means for turning said vane means pivotally through various angles relative to said surface for steering the vehicle by thrust of gas while the vehicle is lifted by ground effect on gas in said plenum space, and said horizontal propulsion and steering means including means for horizontally propelling the vehicle.

4. A vehicle adapted to be raised from a surface by gas pressure and travel and be steered at low altitude represented by a perimetrical gas escape gap relative to said surface, said vehicle including a body having plenum space within an upwardly extending downwardly open hollow underside and said body having an inlet to said plenum space and having a lower perimeter, and means for vertically lifting, horizontally propelling and steering the vehicle, said means including pressurizing means on the vehicle communicating with said plenum space through said inlet for maintaining gas under pressure under said body to support the vehicle in a hovering position in the region of ground effect only with said lower perimeter of said body forming a perimetrical gas escape gap with said surface, and said first-mentioned means including horizontal propulsion and steering means on the vehicle for the vehicle to horizontally propel itself and be steered, said horizontal propulsion and steering means including vane means adapted to turn on a generally horizontal axis extending longitudinally of said body, said vane means being downstream of said pressurizing means and spaced upstream in said plenum space from said lower perimeter, said vane means having communication downstream of said vane means through said plenum space with said lower perimeter, for gas entering through said inlet to impinge upon said vane means and be deflected into said plenum space prior to escape under said lower perimeter to atmosphere, means for turning said vane means pivotally through various angles relative to said surface for steering the vehicle by thrust of gas while the vehicle is lifted by ground effect on gas in said plenum space, and said horizontal propulsion and steering means including means for horizontally propelling the vehicle.

References Cited by the Examiner
UNITED STATES PATENTS

| | | |
|---|---|---|
| 936,395 | 10/09 | Worthington. |
| 986,766 | 3/11 | Schroeder. |
| 1,123,589 | 1/15 | Porter. |
| 1,698,482 | 1/29 | Nicin _____ 180—7 |
| 2,444,318 | 6/48 | Warner. |
| 2,461,435 | 2/49 | Neumann. |
| 2,736,514 | 2/56 | Ross. |
| 2,751,038 | 6/56 | Acheson. |
| 2,814,064 | 11/57 | Montgomery. |
| 2,829,846 | 4/58 | Keiper. |
| 2,838,257 | 6/58 | Wibault. |
| 2,955,780 | 10/60 | Hulbert. |
| 2,968,453 | 1/61 | Bright. |
| 3,090,455 | 5/63 | Crowley _____ 180—7 |

OTHER REFERENCES

Finland, "Teknillinen Aikakauslehti," Nov. 2, 1942, pages 43, 44, 45, 46, 47, 48.

"Washington Post," page C–10 of Sept. 16, 1958, edition.

"Aviation Week," Jan. 12, 1959, pages 74 and 75.

A. HARRY LEVY, *Primary Examiner.*

PHILIP ARNOLD, WILLIAM J. KANOF, *Examiners.*